Feb. 28, 1939.　　　　L. KRÜGEL　　　　2,149,175

RADIO RECEIVING SYSTEM

Filed April 22, 1936

INVENTOR
Lothar Krügel
BY
ATTORNEY

Patented Feb. 28, 1939

2,149,175

UNITED STATES PATENT OFFICE 2,149,175

RADIO RECEIVING SYSTEM

Lothar Krügel, Berlin, Germany, assignor to Telefunken Gesellschaft für Drahtlose Telegraphie m. b. H., Berlin, Germany, a corporation of Germany Application April 22, 1936, Serial No. 75,696
In Germany May 17, 1935

6 Claims. (Cl. 250—11)

The present invention concerns a receiving arrangement for increasing the amplitude ratio of two or more preferably audio-frequency-modulated signals having dissimilar intensities in favor of the signal having a maximum absolute value.

In direction finding receivers as known in the prior art, in order to make the minimum or maximum signal strength which is coming in more conspicuous or marked, tube or valve arrangements are employed which are so organized that the resultant amplification factor or gain of the whole receiver outfit increases with the amplitude of the incoming potential picked up by the antenna in more than direct proportion. In carrying out my invention, therefore, I take advantage of the fact that in frequency doublers the voltage of the doubled frequency is approximately equal to the square of the voltage of the fundamental or original frequency.

The arrangement shown in German Patent 546,845 is predicated upon the use of a directional aerial. From the teachings of that patent it may be observed that it is possible to utilize a constant amplitude signal derived from a radio beacon for obtaining a directional indication merely by orienting a directional antenna so that amplitude differences in the response characteristic may be observed. In such an arrangement it is obvious that the amplitude differences are a trigonometric function of the directional angle and are, therefore, non-linear. In other words, what is involved in the known arrangement, in the reception of a constant permanent signal, is to raise the differential quotient of the incoming field intensity according to the angular position of the directional antenna in an amplifier at the receiving end.

Arrangements have moreover been suggested which have the purpose of raising the amplitude ratio of two or more dissimilar signals and their intensities in favor of the strongest one. The feature of these schemes consists in that two or more signals are compared with one another and that the weaker signals are suppressed in favor of the stronger ones. In apparatus of that kind the threshold of response of the receiver apparatus is always just below the absolutely largest signal amplitude.

All of the means and schemes hereinbefore referred to require tubes and associated circuits which, in turn, require distinct working sources, and which, moreover, are susceptible to a lot of trouble even with the greatest care and precaution.

The receiving arrangement here disclosed and which has the aim and object to raise the amplitude ratio of two or more dissimilarly strong signals, has this characteristic feature that the signal potentials to be compared with one another are fed either sequentially to a joint, or simultaneously each to a distinct, circuit element having a curvilinear or bent current-voltage characteristic which works without amplifying action, the said circuit element with curvilinear characteristic in this scheme beng arranged in the connection between the source of the voltage to be measured and the measuring instrument.

In order that the ratio increment may be made as high as possible, the preferable plan would be to resort to circuit elements whose current-voltage characteristic follows a cube law or an even higher power of the applied potential. Now, this circuit element may be inserted directly between the source of the signal voltages and a load of any desired nature or form. In a great number of practical instances the signals will consist of alternating-current impulses of different frequencies. In cases of this sort, it will be advantageous to employ as circuit elements resistances whose action depends upon the sense of flow (say, copper oxide rectifiers) connected for full-wave rectification. The measuring voltage source and the load in such arrangement are united with two diagonally opposite bridge points.

What has been described before does not imply that the basic idea of this invention is restricted to the use of copper oxide rectifiers forming circuit elements with non-linear characteristic. As a matter of fact, other suitable resistances presenting a non-linear current-voltage characteristic could just as well be used. As practical examples may be cited here, the so-called hot conductors (uranium dioxide) or "Thyrite" resistances disclosed in U. S. Pat. #1,822,742. The said circuit elements also could consist of resistances presenting a marked crystalline structure in which the resistance transversely to the direction of current flow is relatively high. The shapes of the characteristics of resistances of that sort will be referred to hereinafter in the discussion of Figs. 4 and 5.

If the shape of the static characteristic of the circuit elements to be here used is to be preserved also in an operating apparatus, then care must be taken so that the effectively non-reactive resistances of the measuring voltage source, the connecting wires, and the useful load will always be low in contrast with the lowest resistance, arising under operating conditions, of the circuit element having a non-linear current-voltage characteristic.

In the following part of the description reference will be made to the accompanying drawing, in which Fig. 1 shows the basic scheme of the system to which the improvements of my invention may be applied;

The transmitter or beacon is so arranged and equipped that it will send out three directional characteristics which are displaced in reference to one another by a small angle. The carrier waves of these radiations are the same, but each radiation is modulated with a different audio-frequency.

A conventional radio frequency receiver and amplifier is shown at H feeding to low frequency amplifier V. Associated with the output terminals of the receiver are three filter circuits $f_1$, $f_2$, $f_3$ with the corresponding measuring instruments $U_1$, $U_2$ and $U_3$ in which the signal potentials may be read. In the majority of cases, moving-coil type instruments with built-in copper oxide rectifiers are used.

Figure 1:
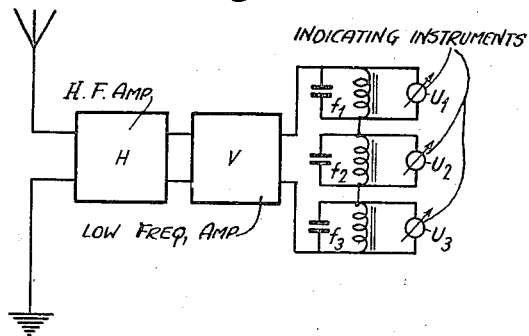
Figure 2:
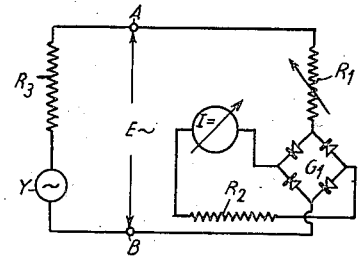
Fig. 2 shows diagrammatically a circuit, the components of which are hereinafter discussed from a theoretical standpoint.

Fig. 2 shows a circuit organization suited therefor. Y is the source of the measuring potentials, $R_3$ represents the corresponding internal resistance. $G_1$ is a bridge arrangement comprising four copper oxide rectifiers. The internal resistance $R_1$ of this rectifier arrangement is a function of the load, and the same is variable within wide limits, a fact which is indicated by an arrow drawn across resistance $R_1$. The moving coil instrument I is in series with a resistance $R_2$ which may, of course, include the internal resistance of the instrument itself.

Figure 3:
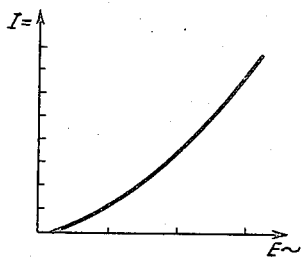
Figs. 3, 4 and 5 are characteristic curves which are also referred to in discusing the principles of my invention.
Figure 4:
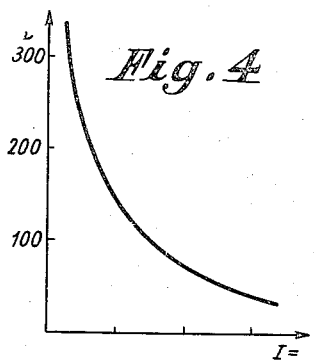

Now, the behavior of this circuit scheme may be understood by reference to Figs. 3 and 4. Fig. 3 shows the current-voltage characteristic which corresponds approximately to the 1.4th power of the potential. Fig. 4 shows the current-resistance characteristic. It will be noted that the internal resistance $R_1$ of the rectifier is a function within wide limits of the load.

Now, according to this invention, the resistance $R_3$ of the measuring voltage source Y and the load $R_2$ are made as low as possible. It will be sufficient, however, if they are made negligibly low compared with the minimum resistance of the rectifier arrangement arising under working conditions.

Figure 5:
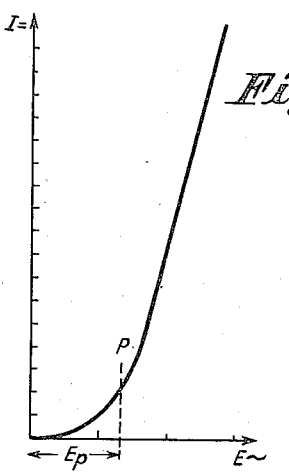

Fig. 5 shows the current-voltage characteristic of the rectifier $G_1$ when the resistances $R_2$ and $R_3$ have been made negligibly small. The steepness of the curve is now considerably greater. The initial part of the characteristic, which is mostly undesirable, may be eliminated by a constant biasing voltage (or a potential available from the apparatus) $E_p$, whereby the working point P may be shifted on the beginning or the border of, or right into, the straight portion of the characteristic. However, if signal voltages presenting amplitudes subject to marked time variation are expected, then the biasing voltage $E_p$ can be made a function of the signal voltage amplitude in such a manner that, when the signal voltage is low, voltage $E_p$ is high, so that the working point will come to be placed in the steepest portion of the characteristic, whereas when the signal potentials are large, the biasing potential $E_p$ becomes so low that the working point falls inside the less steep portion of the characteristic. If this arrangement cooperates with an amplifier, then the biasing potential $E_p$ should preferably be taken off directly or indirectly at suitable points of the amplifier.

Figure 6:
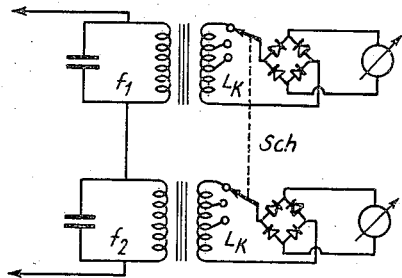
Fig. 6 shows in considerable detail the essential features of the invention which I claim to be new.

Fig. 6 shows an arrangement in which the biasing voltage $E_p$ is produced by part of the signal voltage itself. The size of the measuring voltages may be adjusted simultaneously and in the same sense by a change-over switch Sch designed to connect the rectifier arrangement with different taps upon the secondary end $L_k$ of the filter circuit transformers.

The idea underlying the present invention is not confined to the exemplified embodiments here shown. In fact, other resistances with non-linear-proportional current-voltage characteristic such as uranium oxide or "Thyrite" resistances could be employed, and these would then be suitably inserted in the connecting lead between the measuring voltage source and the load or indicator instrument. If the various signals consist of alternating-current impulses, linearly acting rectifiers may be combined with the last-mentioned resistance as known in the prior art. In choosing the dimensions for the entire arrangement, care must, of course, be taken so that the shape of the characteristic of the non-linear resistances is preserved. As pointed out above, the choice of resistances of all of the circuit elements contained in the same circuit should be made as low as possible.

What is claimed is:

1. A direction-finding receiving apparatus having a plurality of series-connected band-pass filters, each filter comprising a capacitor and the primary winding of a transformer, said filters being respectively tuned to different modulation frequencies, separate indicators each adapted to be fed with energy induced in the secondary of one of said transformers respectively, a full wave rectifier in circuit with each said indicator, taps on each said transformer secondary, and switching means for simultaneously varying in the same sense the effective voltages applied to said indicators through different ones of said taps.

2. A system in accordance with claim 1 and further characterized in that said transformer secondaries and said indicators have a low resistance compared with the lowest resistance normally effective under working conditions in said rectifier.

3. A system in accordance with claim 1 in which said rectifier is constituted by copper-oxide plates.

4. A direction-finding receiving apparatus having a plurality of series-connected band-pass filters, each filter comprising a capacitor and the primary winding of a transformer, said filters being respectively tuned to different modulation frequencies, separate indicators each adapted to be fed with energy induced in the secondary of one of said transformers respectively, a non-linear impedance in circuit with each said indicator, taps on each said transformer secondary, and switching means for simultaneously varying in the same sense the effective voltages applied to said indicators selectively through said taps.

5. A system in accordance with claim 4 and further characterized in that said non-linear impedance possesses a characteristic the shape of which is an exponential function of the applied potential.

6. A system in accordance with claim 4 and further characterized in that said non-linear impedance possesses the resistive properties of the so-called "Thyrite" material.

LOTHAR KRÜGEL.